(12) United States Patent
Lauw et al.

(10) Patent No.: US 10,566,881 B2
(45) Date of Patent: Feb. 18, 2020

(54) MOTOR DRIVE SYSTEM INCLUDING REMOVABLE BYPASS CIRCUIT AND/OR COOLING FEATURES

(71) Applicant: Franklin Electric Co., Inc., Fort Wayne, IN (US)

(72) Inventors: Ryan A. Lauw, Tigard, OR (US); Scott E. Leonard, Portland, OR (US); Dalton H. Paull, Portland, OR (US); Andre P. Perra, Portland, OR (US)

(73) Assignee: Franklin Electric Co., Inc., Fort Wayne, IN (US)

(*) Notice: Subject to any disclaimer, the term of this patent is extended or adjusted under 35 U.S.C. 154(b) by 0 days.

(21) Appl. No.: 16/480,821

(22) PCT Filed: Jan. 29, 2018

(86) PCT No.: PCT/US2018/015797
§ 371 (c)(1),
(2) Date: Jul. 25, 2019

(87) PCT Pub. No.: WO2018/140902
PCT Pub. Date: Aug. 2, 2018

(65) Prior Publication Data
US 2019/0393762 A1     Dec. 26, 2019

Related U.S. Application Data

(60) Provisional application No. 62/451,447, filed on Jan. 27, 2017, provisional application No. 62/451,598, filed on Jan. 27, 2017.

(51) Int. Cl.
*H02K 9/18*     (2006.01)
*H02K 11/33*    (2016.01)
*H02K 5/20*     (2006.01)

(52) U.S. Cl.
CPC ........... *H02K 11/33* (2016.01); *H02K 5/20* (2013.01); *H02K 9/18* (2013.01); *H02K 2205/09* (2013.01); *H02K 2213/06* (2013.01)

(58) Field of Classification Search
CPC . H02K 11/33; H02K 5/20; H02K 9/18; H02K 2205/09; H02K 2213/06
USPC ............................................. 310/52–64, 89
See application file for complete search history.

(56) References Cited

U.S. PATENT DOCUMENTS

| | | |
|---|---|---|
| 1,795,014 A | 3/1931 | Dean |
| 4,308,491 A | 12/1981 | Joyner |
| 4,623,830 A | 11/1986 | Peneder |
| 4,665,319 A | 5/1987 | Seepe |
| 4,967,096 A | 10/1990 | Diemer |
| 5,422,550 A | 6/1995 | McClanahan |

(Continued)

OTHER PUBLICATIONS

International Search Report for PCT/US2018/015797 dated May 30, 2018, 5 pages.

(Continued)

*Primary Examiner* — Naishadh N Desai
(74) *Attorney, Agent, or Firm* — Faegre Baker Daniels LLP

(57) ABSTRACT

A motor control system to drive an alternating-current (AC) motor. The motor control system includes a motor drive. The motor drive may include a duct having first, second and third openings. The motor control system may include a bypass circuit to power the AC motor if the motor drive experiences a fault or to save energy.

22 Claims, 9 Drawing Sheets

(56) References Cited

U.S. PATENT DOCUMENTS

| | | |
|---|---|---|
| 5,473,497 A | 12/1995 | Beatty |
| 5,721,449 A | 2/1998 | Panuce |
| 6,239,513 B1 | 5/2001 | Dean |
| 6,316,896 B1 | 11/2001 | Tikkanen et al. |
| 6,464,464 B2 | 10/2002 | Sabini et al. |
| 6,551,065 B2 | 4/2003 | Lee |
| 6,585,041 B2 | 4/2003 | Crossley |
| 6,697,244 B1 | 2/2004 | Bauer et al. |
| 6,709,241 B2 | 3/2004 | Sabini et al. |
| 6,897,583 B2 * | 5/2005 | Doeffinger ............. H02K 19/36 310/52 |
| 7,081,735 B1 | 7/2006 | Malkowski et al. |
| 7,085,116 B2 | 8/2006 | Kudo et al. |
| 7,246,500 B2 | 7/2007 | Singh et al. |
| 7,460,378 B2 | 12/2008 | Faccin |
| 7,481,069 B2 | 1/2009 | Lifson |
| 7,508,160 B1 | 3/2009 | Rudniski |
| 7,558,031 B2 | 7/2009 | Boren |
| 7,598,628 B2 | 10/2009 | Zver |
| 7,746,020 B2 | 6/2010 | Schnetzka et al. |
| 7,746,624 B2 | 6/2010 | Rispoli et al. |
| 7,764,041 B2 | 7/2010 | Schnetzka et al. |
| 7,800,339 B2 | 9/2010 | Gonzales et al. |
| 7,845,183 B2 | 12/2010 | Blecker |
| 7,876,561 B2 | 1/2011 | Schnetzka et al. |
| 7,948,721 B2 | 5/2011 | Brunner et al. |
| 8,014,110 B2 | 9/2011 | Schnetzka et al. |
| 8,141,623 B2 | 3/2012 | Blecker |
| 8,143,819 B2 | 3/2012 | Burd et al. |
| 8,333,265 B2 | 12/2012 | Kang et al. |
| 8,495,890 B2 | 7/2013 | Jadric et al. |
| 8,561,805 B2 | 10/2013 | Scott |
| 8,564,233 B2 | 10/2013 | Kidd |
| 8,779,698 B2 | 7/2014 | Havard |
| 8,853,974 B2 | 10/2014 | Devos |
| 9,018,882 B2 | 4/2015 | Mack et al. |
| 9,032,748 B2 | 5/2015 | Lau |
| 9,071,078 B2 | 6/2015 | Rockenfeller |
| 9,153,374 B2 | 10/2015 | Kulkarni |
| 9,301,422 B1 * | 3/2016 | Tate ........................ F28F 13/06 |
| 2004/0070939 A1 * | 4/2004 | Peng .................. H05K 7/20163 361/697 |
| 2006/0225445 A1 | 10/2006 | Lifson |
| 2007/0256437 A1 | 11/2007 | Singh et al. |
| 2008/0205001 A1 * | 8/2008 | Saito .................. B60H 1/00521 361/697 |
| 2009/0228149 A1 | 9/2009 | Alston |
| 2010/0314881 A1 | 12/2010 | Stone |
| 2011/0030414 A1 | 2/2011 | Newell |
| 2013/0235494 A1 | 9/2013 | Holce et al. |
| 2015/0042187 A1 * | 2/2015 | Bradfield ................. H02K 5/20 310/59 |
| 2016/0249491 A1 | 8/2016 | Wang |

OTHER PUBLICATIONS

Written Opinion for PCT/US2018/015797 dated May 30, 2018, 5 pages.
AC Tech, Jim Reinwald, Lenze MC1000 Manual, dated Aug. 20, 1997, 82 pages.
Franklin Control Systems, Q-Link Variable Frequency Drive, 125 pages.
Reliance Electric, LiquiFlo AG General Purpose and Vector Duty Drive Software Start-Up and Reference Manual, dated Jun. 2002, 226 pages.

* cited by examiner

MOTOR DRIVE SYSTEM INCLUDING REMOVABLE BYPASS CIRCUIT AND/OR
COOLING FEATURES

CROSS-REFERENCE TO RELATED APPLICATIONS

The present application is a National stage application filed under 37 CFR § 371 of International Application No. PCT/US2018/015797, filed on Jan. 29, 2018, which claims the benefit of U.S. Provisional Patent Applications Nos. 62/451,447 and 62/451,598, filed Jan. 27, 2017, which are incorporated herein by reference in their entirety.

FIELD OF THE DISCLOSURE

The disclosure relates generally to a motor drive system and a method for driving a motor with a motor drive.

BACKGROUND OF THE DISCLOSURE

Electric motors and motor drive systems to drive the electric motors are used in a multitude of applications, including applications in which the motors drive variable torque loads. Example variable torque loads include fans and compressors in HVAC systems. Motor drive systems are also used in fluid pumping systems. Generally, in motor drive systems a sensor measures a characteristic of the load, and the motor drive controls the motor to maintain the characteristic near its setpoint. In some systems, the motor drive measures pressure in a fluid circuit (e.g. water pressure, air-flow pressure, vacuum) and controls the speed of the motor to maintain the pressure near its setpoint.

In a water pumping system, the pump must operate against the well head. Wells can be deep or shallow, and the fluid level within each well varies. The pump pressure can therefore be significantly higher than the pressure sensed by the pressure sensor. The pump pressure can vary significantly between installations and also within the same installation as the level of the fluid in the well rises or falls.

In fire protection, cooling towers, and other systems the pump must operate even if the motor drive fails.

Improvements are desirable to overcome the limitations of existing motor drives and systems in which motor drives are utilized.

SUMMARY

Provided herein are a motor drive, a motor control system comprising a motor drive, and a method of controlling a motor implemented by the motor drive. In one embodiment, a motor control system to drive an AC motor comprises a motor drive including a motor drive controller and configured to generate a motor voltage, the motor drive further comprising an enclosure, a power circuit, a heat sink, an air duct inside the enclosure, and a fan, wherein the enclosure includes an air intake, wherein the air duct includes a first opening adjacent to the air intake, a second opening opposite the first opening, and a top opening, wherein the fan is disposed between the first opening and the second opening, the heat sink is disposed between the fan and the second opening, and the power circuit is disposed between the heat sink and the second opening, and wherein the fan draws air through the air intake and blows the air through the air duct and the top opening to cool the power circuit.

In some embodiments, a motor control system to drive an AC motor comprises a motor drive including a motor drive power supply and a motor drive controller powered by the motor drive power supply, the motor drive configured to generate a motor voltage; a motor drive contactor having first contacts electrically connected between the motor drive and the AC motor; a bypass contactor having second contacts electrically connected between a line voltage source and the AC motor; and a bypass controller including a bypass power supply and an electric circuit connecting the bypass power supply to the motor drive controller to enable the motor drive controller to continue operating if the motor drive power supply does not provide power to the motor drive controller.

In some embodiments, a method of cooling a motor drive comprises generating a motor voltage with a power circuit; drawing air with a fan through an air intake of an enclosure; blowing the air through an air duct located inside the enclosure, wherein the air duct includes a first opening, a second opening opposite the first opening, and a top opening; and extracting heat from a power circuit with a heat sink disposed between the fan and the second opening, wherein the air drawn through the air intake flows through the first opening of the air duct, through the heat sink to draw heat therefrom, and through the top opening to cool the power circuit and the heat sink.

In some embodiments, a motor drive to drive an AC motor comprises a power circuit; a motor drive controller; an outer enclosure including a first air intake; an enclosure within the outer enclosure, the enclosure including a power circuit, a heat sink, an air duct, and a fan, wherein the enclosure includes an air intake and the air duct includes a first opening adjacent to the air intake, a second opening opposite the first opening, and a top opening, wherein the fan is disposed between the first opening and the second opening, the heat sink is disposed between the fan and the second opening, and the power circuit is disposed between the heat sink and the second opening, and wherein the fan draws air through the air intake and blows the air through the air duct and the top opening to cool the power circuit.

DESCRIPTION OF THE DRAWINGS

The features and advantages of the disclosure will become more readily appreciated as the same become better understood by reference to the following detailed description when taken in conjunction with the accompanying drawings, where.

Figure 2:
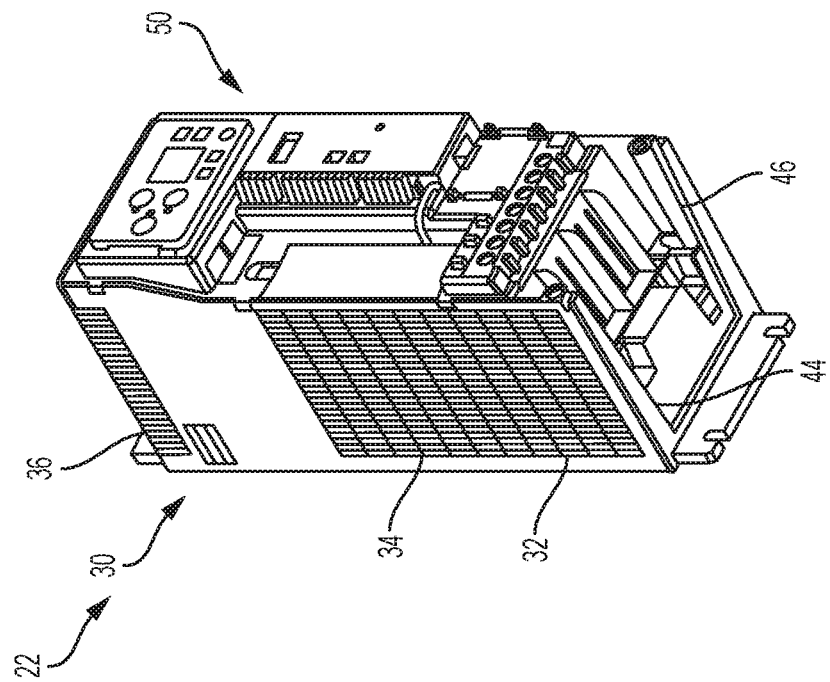
FIG. 2 is a perspective view of the motor drive of FIG. 1 with a cover removed and without the bypass assembly.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION OF DISCLOSED EMBODIMENTS

For the purpose of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings.

Except where a contrary intent is expressly stated, terms are used in their singular form for clarity and are intended to include their plural form. The terms "comprises," "comprising," "containing," and "having" and the like denote an open transition meaning that the claim in which the open transition is used is not limited to the elements following the transitional term. The terms "consisting of" or "consists of" denote closed transitions.

Occurrences of the phrase "in one embodiment," or "in one aspect," herein do not necessarily all refer to the same embodiment or aspect.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Figure 1:
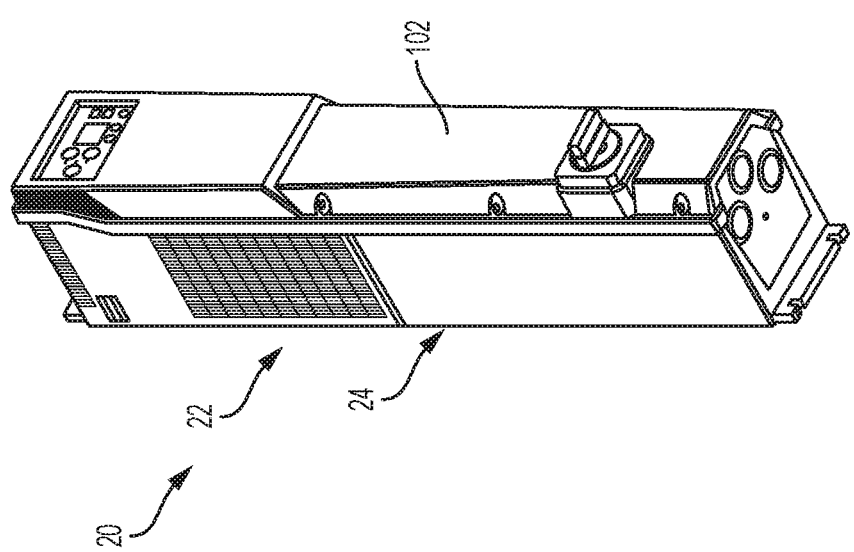
FIG. 1 is a perspective view of an embodiment of a motor drive system including a bypass assembly.
Figure 3:
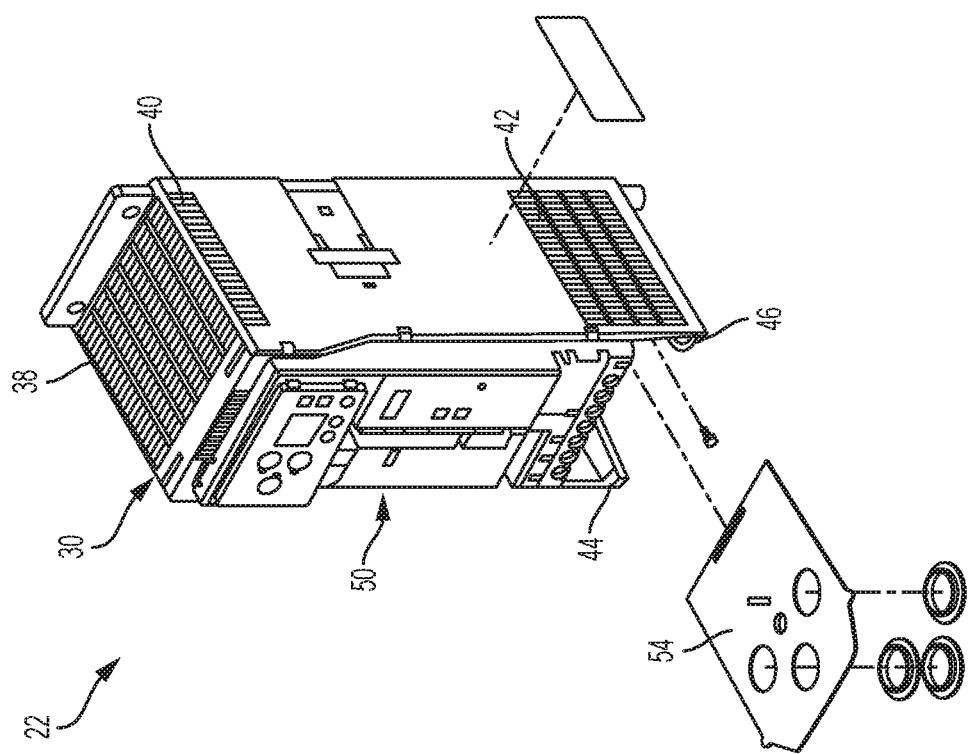
FIG. 3 is a perspective view of the motor drive of FIG. 2 showing a cover.
Figure 3:
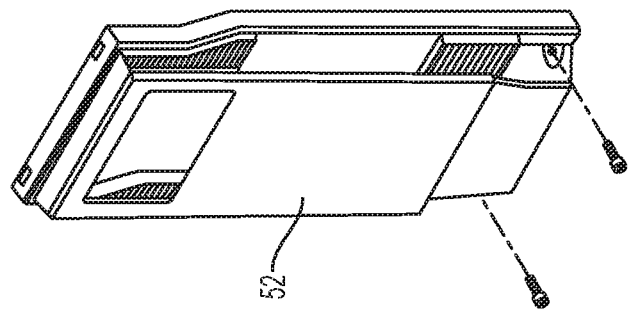
Figure 4:
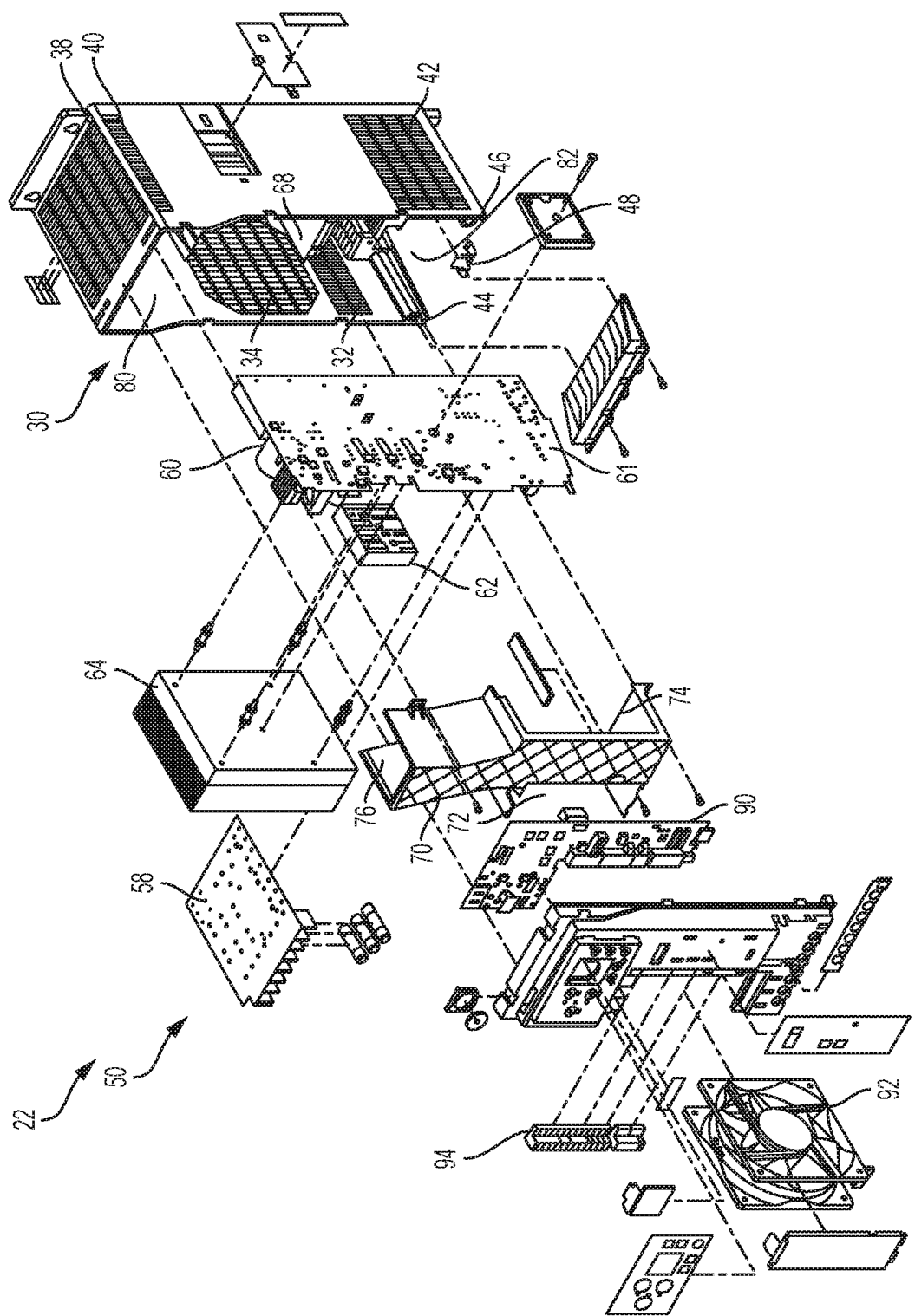
FIG. 4 is an exploded view of the motor drive of FIG. 2.

Embodiments of the disclosure, and others, will now be described with reference to the figures. FIG. 1 is a perspective view of an embodiment of a motor control system 20 including a motor drive 22 and a bypass assembly 24 shown in an assembled state with a cover 102. Referring to FIGS. 2 to 4, shown therein is an embodiment of motor drive 22 including a motor drive enclosure 30 and a motor drive electronics assembly 50. Motor drive (MD) enclosure 30 has ventilation openings or air intakes, respectively 32, 34, 36, 38, 40, and 42. FIG. 3 shows a cable plate 54 including orifices sized and configured to receive power cables therethrough. Motor drive enclosure 30 includes left and right first coupling features 44 and 46, respectively, illustrated as slots sized and configured to slidingly receive cable plate 54. After cable plate 54 is secured in place, a cover 52 is removably attached to motor drive enclosure 30 to enclose electronics assembly 50. First coupling features are also configured to mate with second coupling features, described below. In various embodiments one or the other of a coupling feature may be a slot and a flange configured to slide into the slot.

FIG. 4 is an exploded view of motor drive electronics assembly 50. A ground clip 48 is attached to motor drive enclosure 30 before a power board 60 is inserted into motor drive enclosure 30 where it is received by a pair of slots (not shown) to secure power board 60 in motor drive enclosure 30. A notch 61 on a bottom edge of power board 60 electrically connects to ground clip 48, which is electrically connected to ground, to ground power board 60 when it is received in motor drive enclosure 30. A power circuit 62 and a heat sink 64 are mounted on power board 60. In one example, power circuit 62 comprises a power module including a plurality of power switches coupled to a DC bus of the motor drive and controlled to generate the motor voltage by converting the voltage of the DC bus to an AC voltage.

An air duct 70 includes a left opening 72 sized and configured to receive cooling air pumped by a fan 92 positioned adjacent and on the left side of left opening 72. Once assembled, fan 92 is adjacent ventilation grid 34 and draws air therethrough. Air duct 70 also includes a right opening 74 sized and configured to overlap with heat sink 64. Air duct 70 also comprises a top opening 76. Air flowing through ventilation grid 34 impinges on heat sink 64 and then flows out through top opening 76 and ventilation grids 36, 38, and 40. A dividing wall 68 cooperates with air duct 70 to separate an upper compartment 80 from a lower compartment 82 and prevent air flowing through ventilation grid 34 from flowing into lower compartment 82, thereby preventing heat generated by power circuit 62 from heating components located below. Air pumped by a lower compartment, or second, fan 338 (shown in FIGS. 9-11) flows from inner air intake 32 to ventilation opening 42 to cool components in lower compartment 82. Below power board 60, in lower compartment 82, is positioned a fuse board 58.

A motor drive controller 90 includes control logic configured to control operation of a motor by providing switching signals to power circuit 62 to generate motor voltages. Motor drive controller 90 may be mounted on power board 60. An example motor drive controller 90 is described with reference to FIG. 7. Techniques for generating motor voltages according to characteristics of a control signal are known in the art. In one example, a technique comprises storing values in a table corresponding to samples of an operating curve. The operating curve is typically a substantially straight line defining a volts-hertz relationship. When the control system determines a desired operating speed, which defines an operating frequency, control logic looks up a voltage corresponding to the frequency and generates switching signals provided to power circuit 62 to generate a motor voltage based on the voltage and the frequency. In another example, a formula or a function embodying the operating curve characteristics is used by the control logic to generate the desired motor voltages. Control logic determines the reference speed to, for example, maintain a pressure signal from a transducer about a programmed setpoint. The control logic may include a pulse-width-modulation (PWM) module to generate the switching signals. The power circuit 62 receives DC power supplied by a rectifier circuit which rectifies the line power to generate the motor voltage.

A terminal block 94 is provided to connect various conductors to an input/output (I/O) interface of motor drive controller 90. Example conductors include a pressure signal conductor, a temperature signal conductor, a serial communications conductor, and any other conducting element necessary or desirable to connect various transducers to motor drive controller 90.

Figure 5:
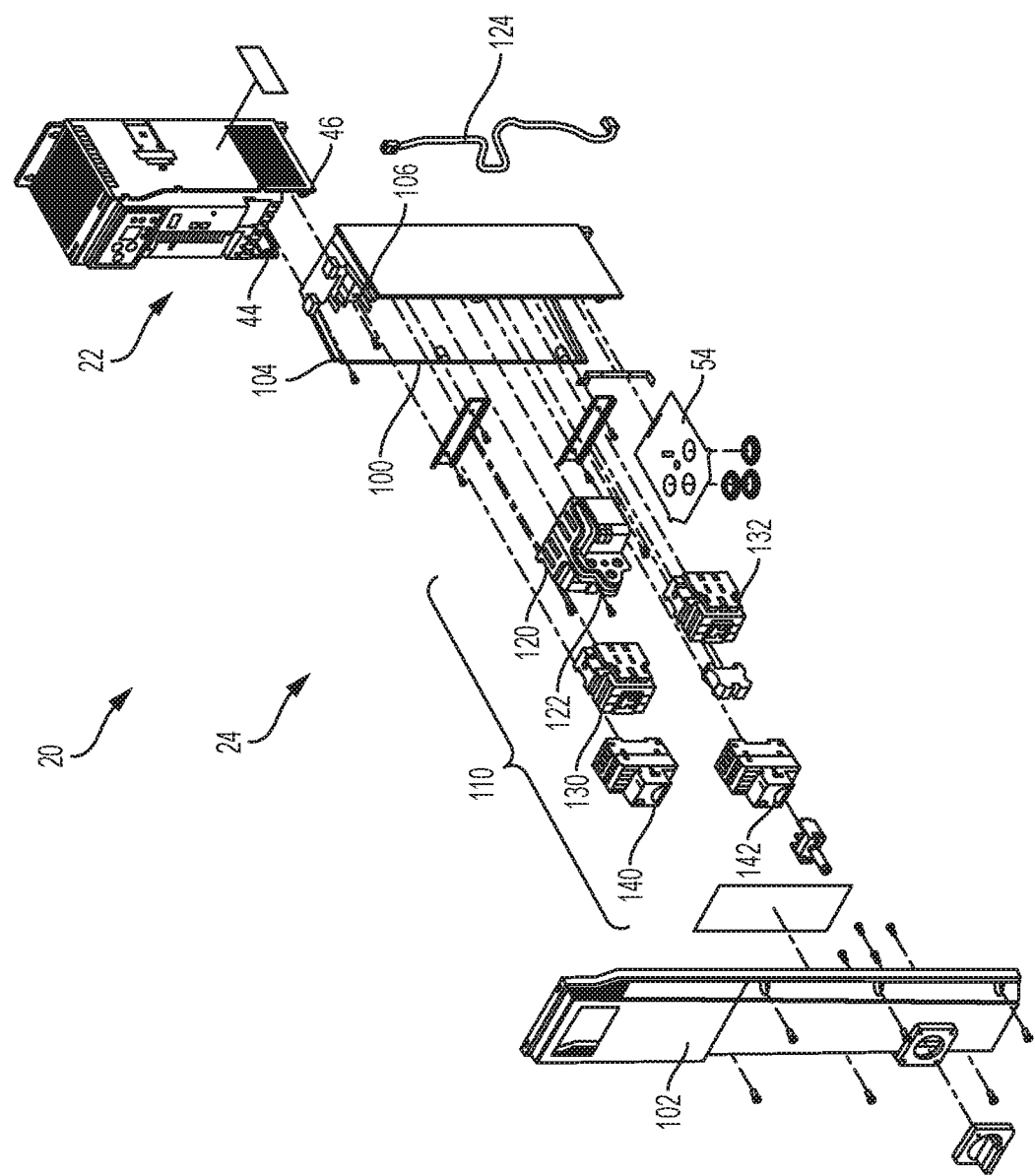
FIG. 5 is a perspective view of the motor drive of FIG. 1 showing an exploded view of an embodiment of the bypass assembly.

FIG. 5 is a perspective view of motor control system 20 showing an exploded view of an embodiment of a bypass assembly 24 including a bypass assembly enclosure 100 comprising left and right second coupling features 104 and 106, respectively, illustrated as flanges which are sized and configured to be slidingly received, and mate, with left and right first coupling features 44 and 46, to secure bypass assembly enclosure 100 to motor drive enclosure 30, thereby removably attaching bypass assembly 24 to motor drive 22. Bypass assembly enclosure 100 includes in a lower portion thereof a pair of slots to receive cable plate 54.

Bypass assembly enclosure 100 houses a bypass circuit 110 comprising a bypass controller 120, a MD contactor 130, a bypass contactor 132, an MD disconnect switch 140 coupled to MD contactor 130, and a main disconnect switch 142 coupled to bypass contactor 132. A serial communications cable 124 is provided to communicatively couple motor drive controller 90 with bypass controller 120.

Operation of bypass circuit 110 will now be described with reference to FIG. 6. Motor drive 22 is operable to control an infinitely variable speed of a motor 150 based on programmable setpoints of control variables, such as pressure. During normal operation, motor drive 22 generates a run signal, or bypass disable command, on a bypass circuit coupling conductor 146 which is received by bypass controller 120. The run signal commands bypass controller 120 to operate MD contactor 130 and bypass contactor 132 to electrically couple motor drive 22 to motor 150. In one example, the contacts of MD contactor 130 and bypass contactor 132 are normally-open and bypass controller 120 engages MD contactor 130 to close its contacts thereby coupling the output contacts of motor drive 22 to motor 150. During bypass operation, motor drive 22 generates a bypass signal, or bypass enable command, which may be the Boolean opposite of the run signal, on bypass circuit coupling conductor 146. The bypass signal commands bypass controller 120 to operate MD contactor 130 and bypass contactor 132 to electrically couple motor drive 22 to line voltage. In one example, the contacts of MD contactor 130 and bypass contactor 132 are normally-open and bypass controller 120 engages bypass contactor 132 to close its contacts thereby coupling the line voltage to motor 150. The bypass enable and disable commands may be communicated via a serial communications link. In one example, the serial communications link is bidirectional and the bypass controller is configured to communicate data to the variable frequency drive, including data values representing the current flowing to the motor through the bypass contactor.

Figure 6:
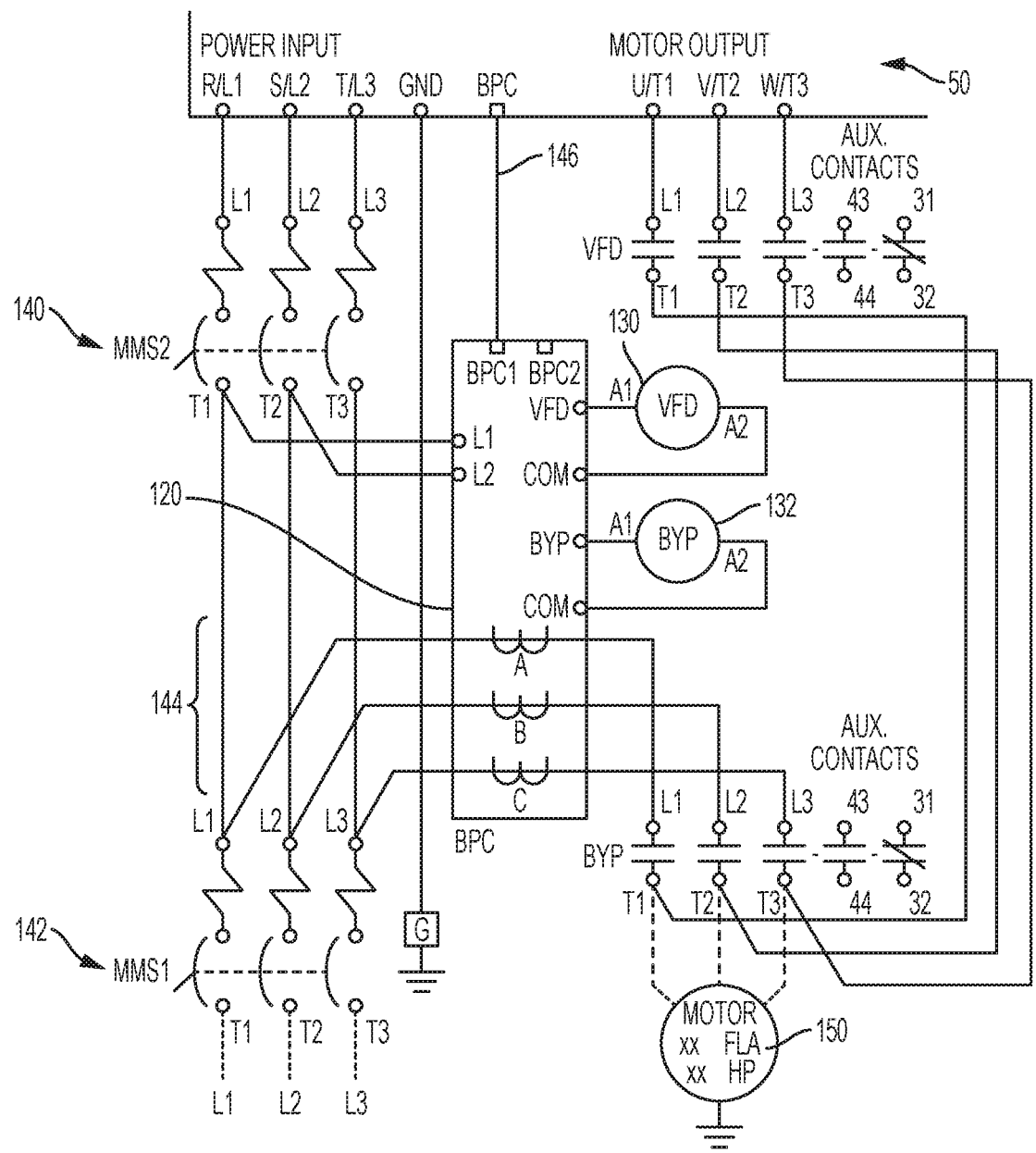
FIG. 6 is a schematic diagram of the bypass assembly of FIG. 5.

As shown in FIG. 6, output contacts of main disconnect switch 142 (e.g. MMS1) are electrically coupled to MD disconnect switch 140 and to the contacts of bypass controller 120. Output contacts of MD disconnect switch 140 are connected to motor drive 22. Therefore, MD disconnect switch 140 may be shut off to disconnect power to motor drive 22, while still permitting power to flow to motor 150 in the bypass mode of operation. Bypass controller 120 includes current transformers 144 coupled to the outputs of main disconnect switch 142.

Figure 7:
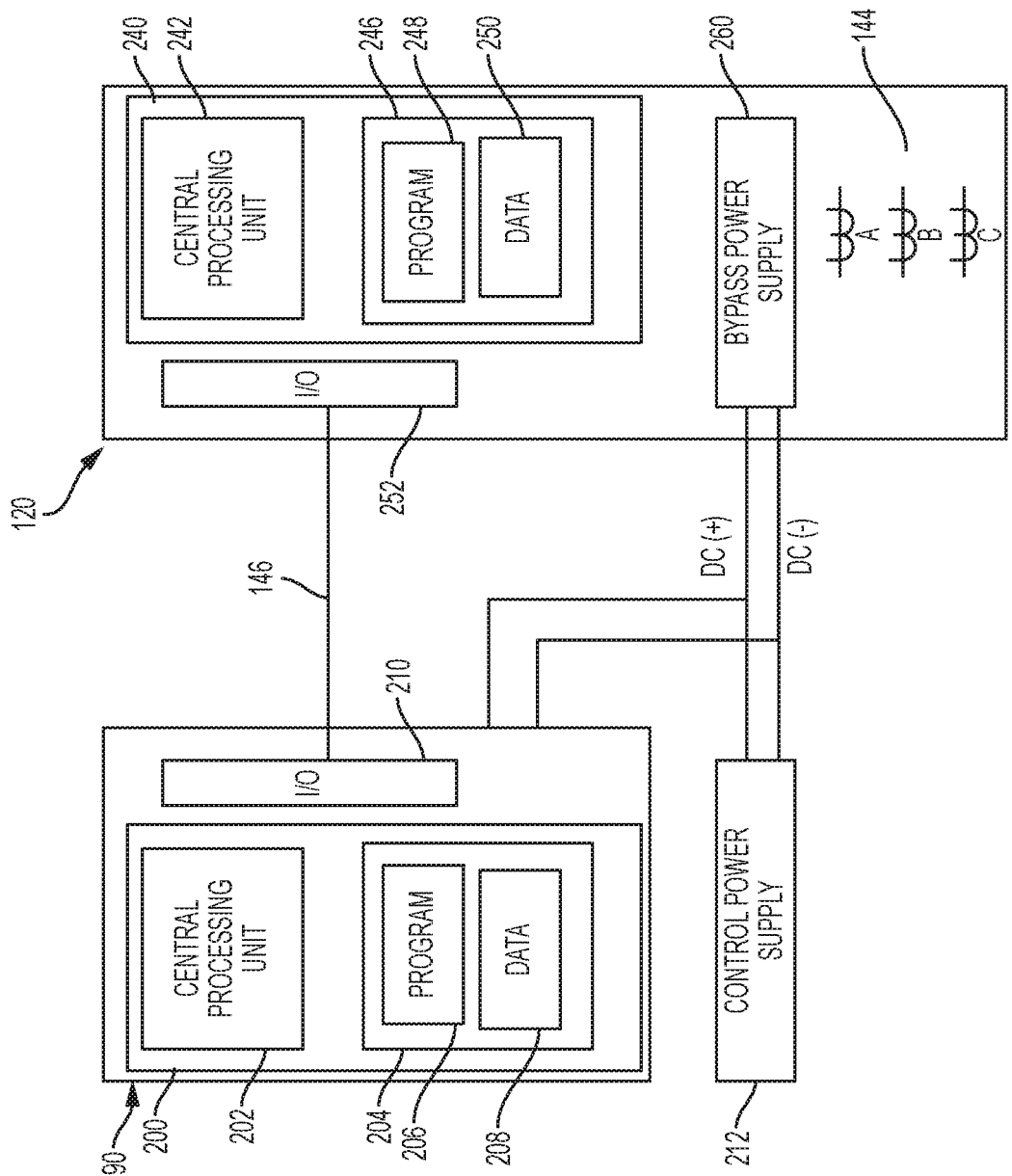
FIG. 7 is a block diagram of an embodiment of a bypass controller coupled to a motor drive controller.

FIG. 7 is a block diagram of an embodiment of bypass controller 120 electrically coupled to motor drive controller 90. In one embodiment, motor drive controller 90 comprises control logic 200 including a central processing unit 202, a memory 204 including a program 206 and data 208, and also comprises an I/O interface 210. An MD power supply 212 is electrically coupled to motor drive controller 90 to provide power thereto. Example power provided to power motor drive controller 90 includes 24 VDC power. MD power supply 212 may be mounted on power board 90.

In one embodiment, bypass controller 120 comprises control logic 240 including a central processing unit 242, a memory 246 including a program 248 and data 250, and also comprises an I/O interface 252. Bypass controller 120 also comprises current transformers 144 and a bypass power supply 260 electrically coupled to power control logic 240. Advantageously, bypass power supply 260 is also electrically coupled to provide power to motor drive controller 90 upon failure of MD power supply 212. Central processing unit 242 processes instructions in program 246 to evaluate the current flowing through the power conductors suppling power to the motor to determine if any fault conditions have occurred that merit shutting down the motor, and if such conditions occurred, to open the contracts of bypass contactor 132 to shut the motor down. Bypass power supply 260 or control logic 240 may comprise circuits configured to electrically connect or disconnect bypass power supply 260 to motor drive controller 90. In one example, MD power supply 212 and bypass power supply 260 are each connected to the load through diodes connected in series between each power supply and the load to prevent back-feed if one of the power supplies fails.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

In one embodiment, control logic 200 engages bypass controller 120 to switch from variable speed control to constant speed control to save energy. Control logic 200 monitors the speed reference and when the speed reference remains substantially at line frequency (e.g. 60 Hz) for a predetermined time, control logic 200 sends a bypass signal to control logic 240, and in turn bypass control logic 240 operates motor drive contactor 130 and bypass contactor 132 to open the motor drive contactor 130 contacts and close the bypass contactor 132 contacts. Thereafter motor 150 runs at line voltage and frequency. When the speed reference falls substantially below the line frequency, the process is reversed and motor 150 is again powered by motor drive 22. In one example, motor drive 22 is bypassed when the speed reference is about +/−5% of the line frequency for about 60 seconds. In one example, motor drive 22 is bypassed when the speed reference is about 4 Hz below the line frequency for about 60 seconds. Control logic 200 may enter a speed search mode to determine, based on current flow, what the actual speed of motor 150 is, to thereby engage motor 150 at that speed before adjusting the speed to a desired speed to maintain setpoint. The speed search mode prevents an overload trip that may occur when the bypass is canceled. In one example, if the motor speed drops 5 Hz between the time that the bypass contactor opens and the time that the VFD starts, the speed search will detect this drop and start the VFD at the actual motor speed so that there is a smooth transition between bypass and VFD operation.

In another embodiment, control logic 240 of bypass controller 120 switches from variable speed control to constant speed control upon determining that a fault in the power circuit 62 of motor drive 22 is preventing operation of motor 150. Any fault detected by the VFD control circuitry, whether caused by a fault condition internal or external to the power circuitry, can be configured to trigger a switch from variable to constant speed operation. Generally, a fault which prevents the VFD from operating the motor will trigger the bypass mode while other faults may programmed to optionally trigger the bypass mode. Faults corresponding to motor or wiring failures may cause the disconnection of the VFD from the motor while preventing the engagement of the bypass contactor.

Control logic 240 provides control power to control logic 200 via bypass power supply 260 to enable control logic 200 to continue monitoring input signals, determining faults, communicating faults and respective alarms, including communicating the failure of MD power supply 212. Thus, even upon failure of MD power supply 212, control logic 200 of motor drive 22 continues to operate. This feature may be of particular interest in systems that must continue operation even if not able to maintain setpoint operation, for example pumps in cooling towers, where excess pumping results in lower temperatures, which is preferable to overheating the systems cooled by the cooling towers.

Figure 9:
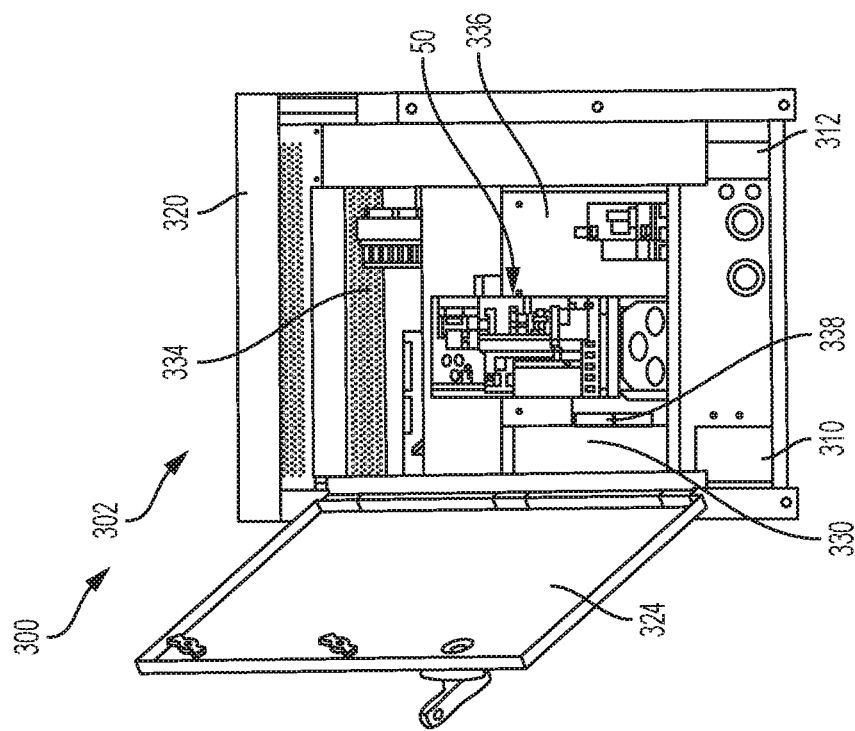
FIGS. 8 and 9 are perspective views of another embodiment of a motor drive including a hinged front cover.
Figure 8:
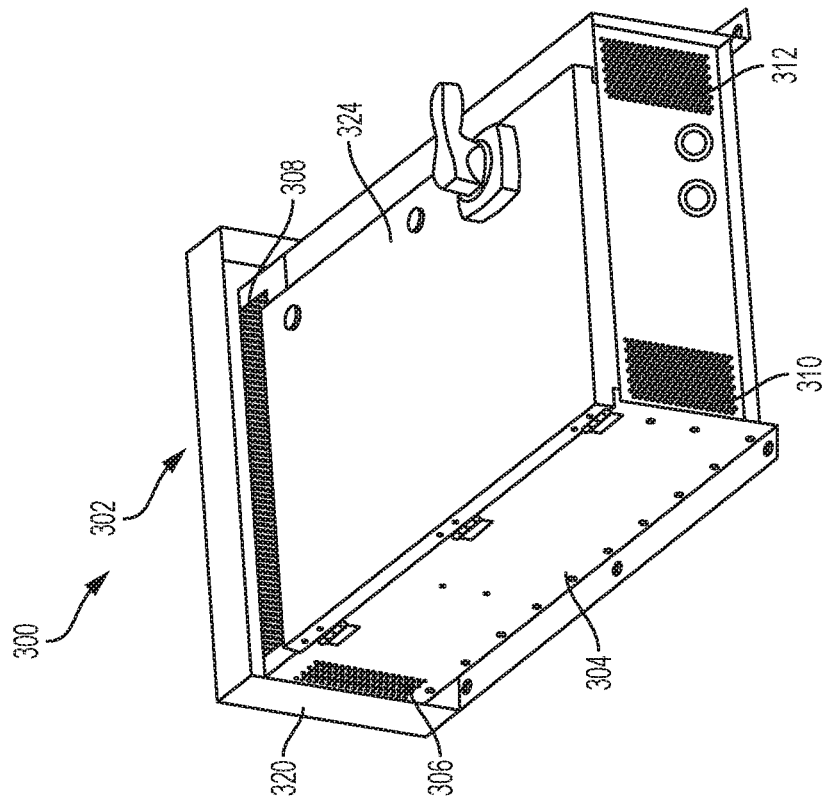
Figure 10:
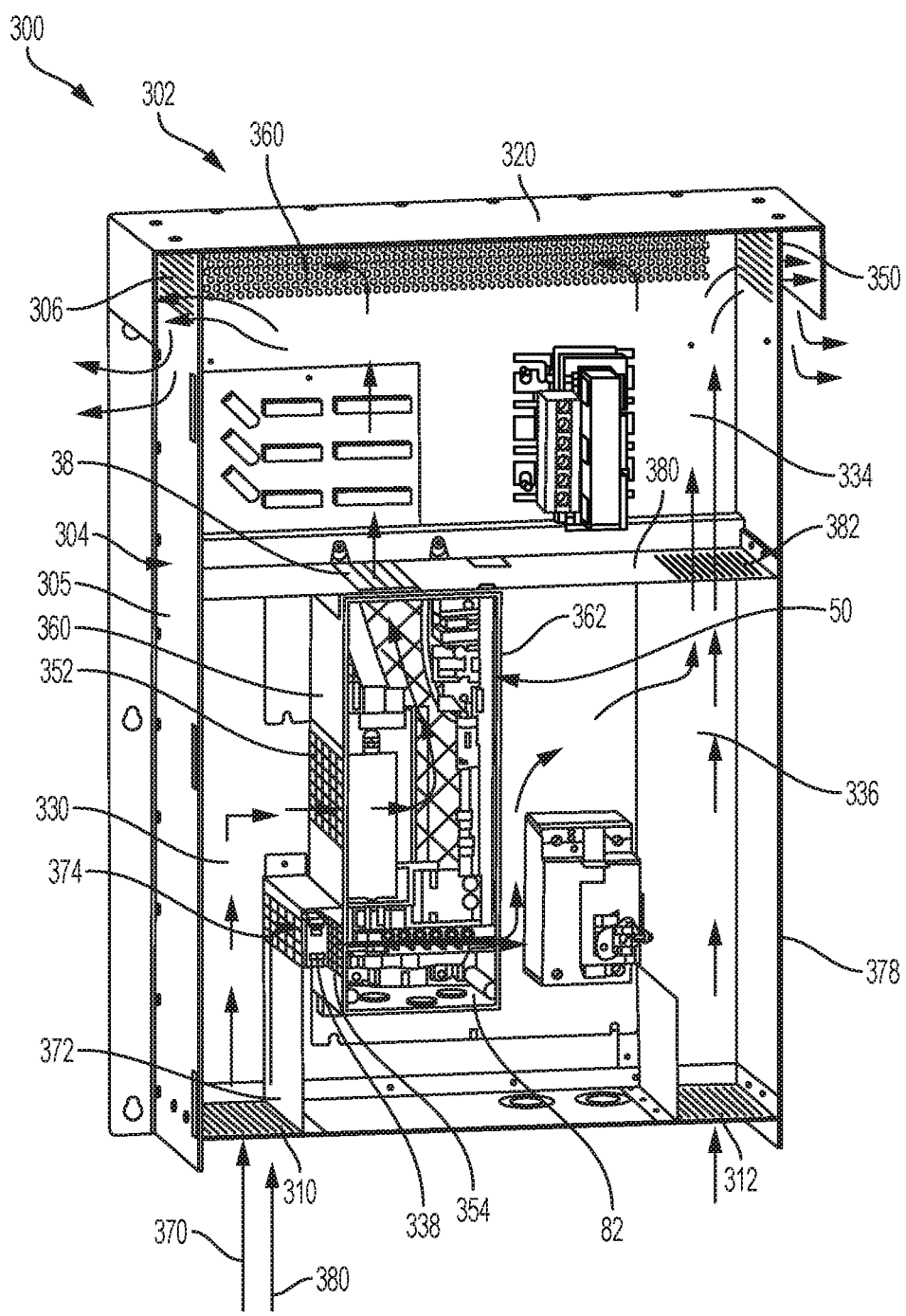
FIG. 10 is a plan view the motor drive of FIG. 8 with the front cover removed.

FIGS. 8 and 9 are perspective views of an embodiment of a motor drive 300 comprising motor drive electronics assembly 50. Motor drive 300 is substantially the same as motor drive 22 except for the absence of bypass features and inclusion of an outer enclosure 302. Accordingly, motor drive 300 includes power circuit 62, heat sink 64, air duct 70, and fan 92. In the present embodiment motor drive enclosure 30, referred to as inner housing 30, includes an inner air intake 352 and first opening 72 is adjacent to inner air intake 352 (shown in FIGS. 10 and 11). FIG. 10 is a front plan view of motor drive 300. Outer enclosure 302 comprises a body 304 supporting a front cover 324 with a plurality hinges. On a bottom wall of enclosure body 304 are left and right air intakes 310 and 312. A rain hood 320 extends over an upper portion of enclosure body 304. Ventilation grids 306 and 308 are provided on the left and front sides of enclosure body 304 to permit airflow while preventing the penetration of rainwater therethrough. Inside enclosure body 304 there is a first compartment 330 between a first vertical wall 305 of enclosure body 304 and a first vertical inner wall 360 of motor drive electronics assembly 50. Air penetrates left air intake grid 310 and flows through compartment 330 and inner air intake 352 (shown in FIG. 10) into and then through air duct 70 to cool heat sink 64 before it flows upward to a top compartment 334 and thereafter flows out of enclosure body 304 through ventilation grids 306, 307, 308, and 350 (shown in FIG. 10) in what may be referred to as first cooling path 370. On the right side of motor drive electronics assembly 50 is a compartment 336 and below is a fan 338 adjacent an inner air intake 354. Air penetrates left air intake grid 310 and flows through inner air intake 354, through the fuse panel, and into compartment 336 before flowing out through ventilation grids 306, 307, 308, and 350 in what may be referred to as second cooling path 380. Air can also ingress through right air intake grid 312 to provide additional cooling and balance the air pressure inside outer enclosure 302. Various filters are positioned in top compartment 334. This construction allows the motor drive electronics assembly 50 to stay within its specified temperature requirements without the need for additional fan and dust filter assemblies to force air in and out of the enclosure. Without additional fans, the end user will not have to service the enclosed assembly as frequently as an enclosed motor drive assembly that does require additional means to keep the temperature inside the enclosure within the motor drive assemblies' requirements. Additionally, because filters are the components which reach the highest temperature during normal operation, keeping filters positioned in the top compartment 334 reduces the amount of radiated heat that the motor drive assembly will be exposed to. Consequently, the arrangement of outer enclosure 302 and motor drive electronics assembly 50 as depicted herein increases the reliability of the system while reducing maintenance requirements.

Figure 11:
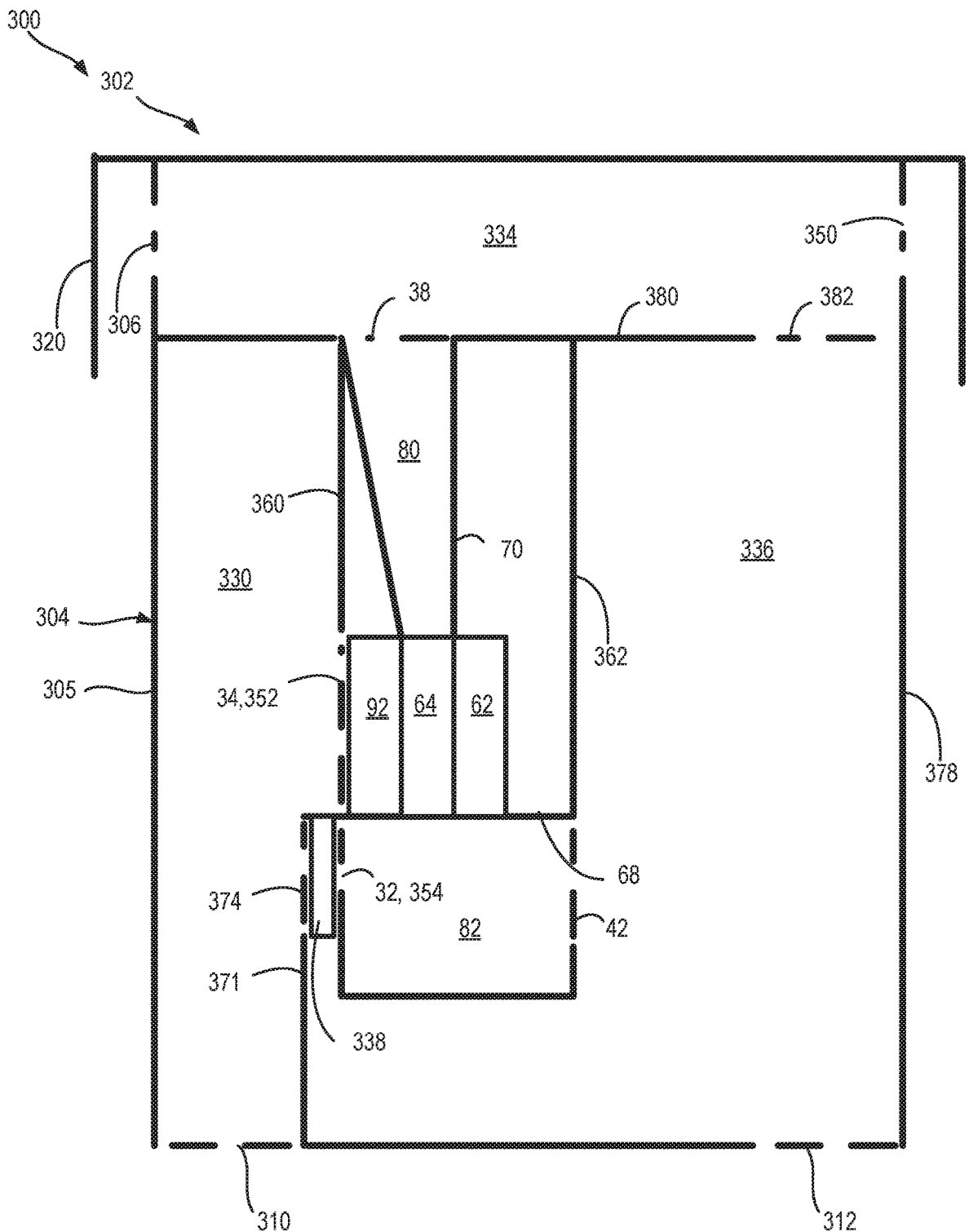
FIG. 11 is a block diagram of the motor drive of FIG. 8.

Referring now to FIG. 11, as described above motor drive 300 comprises outer enclosure 302, inner housing 30 within outer enclosure 302, air duct 70, first fan 92 disposed between first opening 72 and second opening 74 of air duct 70, heat sink 64 disposed between first fan 92 and second opening 74, and power circuit 62 disposed between heat sink 64 and second opening 74. First fan 92 draws air through first air intake 310 of outer enclosure 302 and blows the air through air duct 70 and top opening 76 of air duct 70 to cool power circuit 62.

In some embodiments, outer enclosure 302 comprises body 304 and first outer wall 305 having a ventilation opening 306 covered by rain hood 320. Between first outer wall 305 and inner housing 30 is first compartment 330. Inner housing 30 includes a first inner wall 360 including first inner air intake 32, 354 and second inner air intake 34, 352, and a second inner wall 362 having first inner housing ventilation opening 42. Air flows from first air intake 310 into first compartment 330 and then into lower compartment 82 through first inner air intake 32, 354.

In some embodiments, a third inner wall 372 includes a third inner air intake 374. Air flows from first air intake 310 into lower compartment 82 through third inner air intake 374 and first inner air intake 32, 354 by operation of a second fan 338 disposed between them. Air flows out of lower compartment 82 through ventilation opening 42 into a compartment 336 defined by second inner wall 362 and a second outer wall 378 of body 304 having therein ventilation opening 350. A fourth inner wall 380, having therein openings 38 and 382, separate compartment 336 and compartment 334.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a controller includes, for example, a central processing unit, a math processing unit, a plurality of processors on a common integrated circuit, and a plurality of processors operating in concert, whether physically or electronically coupled. Furthermore and in a similar manner, the term "program" includes a single application, a plurality of applications, one or more programs or subroutines, software, firmware, and any variations thereof suitable to execute instruction sequences with a processing device.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A motor control system to drive an alternating-current (AC) motor, the motor control system comprising:
   a motor drive including a motor drive controller configured to generate a motor voltage, the motor drive further comprising
   an enclosure;
   a power circuit;
   a heat sink;
   an air duct inside the enclosure; and
   a fan,
   wherein the enclosure includes an air intake,
   wherein the air duct includes a first opening adjacent to the air intake, a second opening opposite the first opening, and a top opening,
   wherein the fan is disposed between the first opening and the second opening, the heat sink is disposed between the fan and the second opening, and the power circuit is disposed between the heat sink and the second opening, and
   wherein the fan draws air through the air intake and blows the air through the air duct and the top opening to cool the power circuit.

2. The motor control system of claim 1, the motor drive including and powered by a motor drive power supply, the motor control system further comprising a motor drive contactor having first contacts electrically connected between the motor drive and the AC motor; a bypass contactor having second contacts electrically connected between a line voltage source and the AC motor; and a bypass controller including a bypass power supply and an electric circuit connecting the bypass power supply to the motor drive controller to enable the motor drive controller to continue operating if the motor drive power supply does not provide power to the motor drive controller.

3. The motor control system of claim 2, wherein the electric circuit enables the motor drive controller to continue operating if the motor drive power supply becomes inoperable due to a component failure.

4. The motor control system of claim 2, wherein the bypass controller comprises bypass control logic structured to operate the bypass contactor to close the second contacts and operate the motor drive contactor to open the first contacts responsive to a bypass enable command from the motor drive controller and to operate the bypass contactor to open the second contacts and close the first contacts responsive to a bypass disable command from the motor drive controller.

5. The motor control system of claim 2, wherein the motor controller is structured to generate a speed reference and to command the bypass controller to connect the AC motor to the line voltage source upon determining that the speed reference is substantially equal to a line frequency of the line voltage source.

6. The motor control system of claim 5, wherein the speed reference is substantially equal to the line frequency of the line voltage source when the speed reference is +/−5 hertz of the line frequency.

7. The motor control system of claim 1, wherein the motor drive enclosure includes first coupling features, and wherein the motor control system further comprises a bypass assembly enclosure housing the bypass controller, the bypass contractor, and the motor drive contactor and including second coupling features, wherein the first coupling features are configured to mate with the second coupling features to detachably attach the motor drive and the bypass assembly enclosure.

8. The motor control system of claim 7, wherein the bypass assembly enclosure is positioned below the motor drive enclosure when the first coupling features are mated with the second coupling features.

9. The motor control system of claim 7, wherein the first coupling features are configured to slidingly receive the second coupling features or the second coupling features are configured to slidingly receive the first coupling features.

10. The motor control system of claim 9, wherein the first coupling features comprise one of a slot or a ledge and the second coupling features comprise the other of a slot or a ledge.

11. The motor control system of claim 1, wherein the enclosure includes opposite walls comprising a second air intake on one wall and a ventilation opening on the opposite wall, the motor drive further comprises a second fan disposed below the air duct and arranged to draw air from the second air intake and blow the air through the ventilation opening to cool electrical components positioned below the air duct.

12. The motor control system of claim 11, further comprising a dividing wall extending between the opposite walls to divide the enclosure into an upper compartment and a lower compartment, wherein the fan draws air into the upper compartment through the air intake and the dividing wall prevents air drawn by the fan into the upper compartment from circulating into the lower compartment.

13. The motor control system of claim 11, wherein the fan and the second fan draw all the air that flows through the enclosure.

14. A motor drive to drive an alternating-current (AC) motor, the motor drive comprising:
   a power circuit;
   a motor drive controller;
   an outer enclosure including a first air intake; and
   an enclosure within the outer enclosure, the enclosure including a power circuit, a heat sink, an air duct, and a fan,
   wherein the enclosure includes an air intake and the air duct includes a first opening adjacent to the air intake, a second opening opposite the first opening, and a top opening, wherein the fan is disposed between the first opening and the second opening, the heat sink is disposed between the fan and the second opening, and the power circuit is disposed between the heat sink and the second opening, and
   wherein the fan draws air through the air intake and blows the air through the air duct and the top opening to cool the power circuit.

15. The motor drive of claim 14, wherein the enclosure includes opposite walls comprising a second air intake on one wall and a ventilation opening on the opposite wall, the motor drive further comprising a second fan disposed below the air duct and arranged to blow the air through the second air intake and the ventilation opening to cool electrical components positioned below the air duct.

16. The motor drive of claim 15, further comprising a dividing wall extending between the opposite walls to divide the enclosure into an upper compartment and a lower compartment, wherein the fan draws air into the upper compartment through the air intake and the dividing wall prevents air drawn by the fan into the upper compartment from circulating into the lower compartment.

17. The motor drive of claim 16, further comprising a second air intake, wherein the second fan draws air through the second air intake and blows the air through the lower compartment and the ventilation opening to cool the electrical components positioned below the air duct.

18. The motor drive of claim 14, wherein the outer enclosure and the enclosure form a first compartment, wherein the fan and the fan draw all the air that flows through the outer enclosure.

19. A method of cooling a motor drive 22, the method comprising:

generating a motor voltage with a power circuit;

drawing air with a fan through an air intake of an enclosure;

blowing the air through an air duct located inside the enclosure, wherein the air duct includes a first opening, a second opening opposite the first opening, and a top opening; and extracting heat from a power circuit with a heat sink disposed between the fan and the second opening, wherein the air drawn through the air intake flows through the first opening of the air duct, through the heat sink to draw heat therefrom, and through the top opening to cool the power circuit and the heat sink.

20. The method of claim 19, wherein the enclosure comprises a dividing wall extending between opposite walls to divide the enclosure into an upper compartment and a lower compartment, wherein method comprises drawing the air into the upper compartment and preventing the air from circulating into the lower compartment.

21. The method of claim 20, further comprising drawing air through the lower compartment with a second fan.

22. The method of claim 19, further comprising drawing all the air flowing through the enclosure with the fan and a second fan.

* * * * *